(12) United States Patent
Bailey

(10) Patent No.: US 6,904,927 B2
(45) Date of Patent: Jun. 14, 2005

(54) DIVERTER ASSEMBLY WITH INTEGRAL WATER-HAMMER ARRESTOR

(75) Inventor: Robert W. Bailey, Mossley (CA)

(73) Assignee: Masco Corporation of Indiana, Indianapolis, IN (US)

( * ) Notice: Subject to any disclaimer, the term of this patent is extended or adjusted under 35 U.S.C. 154(b) by 153 days.

(21) Appl. No.: 10/384,036

(22) Filed: Mar. 7, 2003

(65) Prior Publication Data

US 2004/0173259 A1 Sep. 9, 2004

(51) Int. Cl.$^7$ .......................... F16K 47/02; G05D 11/00
(52) U.S. Cl. .............................. 137/119.05; 137/315.12; 137/597; 137/625.17
(58) Field of Search ..................... 251/337; 137/119.03, 137/119.04, 119.05, 119.06, 315.12, 625.48, 597, 625.17, 119.08

(56) References Cited

U.S. PATENT DOCUMENTS

| | | | |
|---|---|---|---|
| 2,009,651 A | * | 7/1935 | Conde et al. .................. 4/570 |
| 3,570,522 A | | 3/1971 | Horsch et al. |
| 3,785,391 A | | 1/1974 | Miller |
| 3,842,857 A | | 10/1974 | McCornack |
| 4,019,527 A | | 4/1977 | Brand |
| 4,361,168 A | | 11/1982 | McCornack |
| 4,450,868 A | | 5/1984 | Duval et al. |
| 4,577,653 A | * | 3/1986 | Marty .................... 137/119.04 |
| 4,874,006 A | * | 10/1989 | Iqbal ..................... 137/119.05 |
| 4,899,778 A | | 2/1990 | Laube |
| 4,927,115 A | * | 5/1990 | Bahroos et al. ............. 251/241 |
| 4,991,819 A | | 2/1991 | Laube |
| 5,472,010 A | | 12/1995 | Gonzalez |
| 5,655,563 A | | 8/1997 | Johnson |
| 5,738,135 A | | 4/1998 | Johnson |
| 5,743,286 A | * | 4/1998 | Ko ......................... 137/119.04 |
| 5,755,251 A | | 5/1998 | Simonette |
| 5,845,670 A | * | 12/1998 | Life ....................... 137/119.05 |
| 5,881,754 A | * | 3/1999 | Wei ....................... 137/119.04 |
| 5,918,621 A | | 7/1999 | Gilmore |
| 6,125,822 A | | 10/2000 | Janik et al. |
| 6,142,389 A | | 11/2000 | Kynett |
| 6,244,253 B1 | | 6/2001 | Haeberer et al. |
| 6,378,790 B1 | | 4/2002 | Paterson et al. |
| 6,446,613 B1 | | 9/2002 | Djordjevic |

FOREIGN PATENT DOCUMENTS

| | | | |
|---|---|---|---|
| JP | 05263985 A | * | 10/1993 |
| JP | 08210552 A | * | 8/1996 |

* cited by examiner

*Primary Examiner*—Ramesh Krishnamurthy
(74) *Attorney, Agent, or Firm*—Woodard, Emhardt, Moriarty, McNett & Henry LLP

(57) ABSTRACT

A faucet diverter assembly for dampening a pressure spike includes a body and a diverter bonnet assembled into the body defining a flow passageway therebetween. A diverter portion is assembled into the diverter bonnet and is axially movable by the use of an extender. The diverter portion includes and upper stem and a lower stem attached to the upper stem. Assembled onto the lower stem is a movable plunger that is spring biased by a spring positioned between the plunger and the upper stem. A return spring, received by the upper stem, acts between the upper stem and the diverter bonnet. When a pressure spike is encountered, the pressure force is sensed by the plunger by way of a flow inlet passage and movement of the plunger, in response to the pressure force, compresses the plunger spring, thereby functioning as a shock absorber.

48 Claims, 10 Drawing Sheets

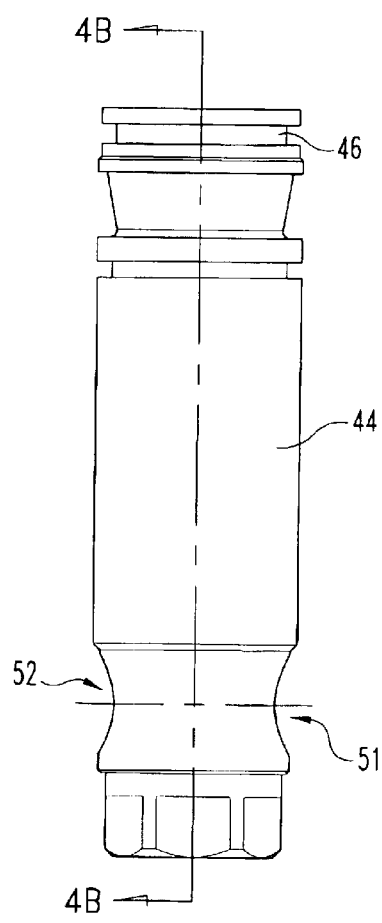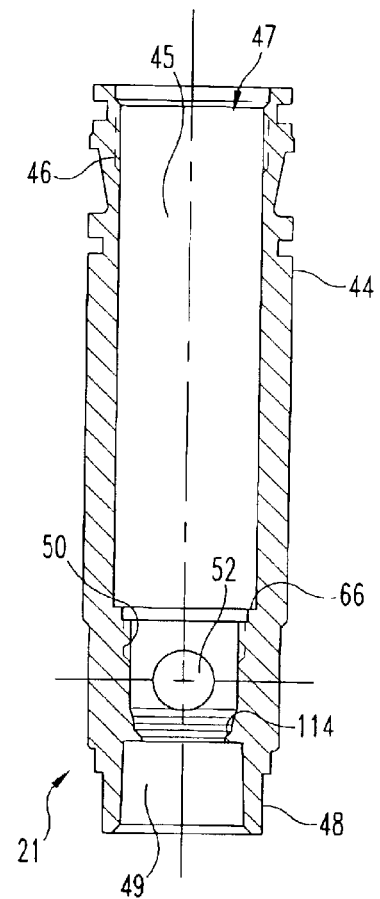
*Fig. 4A*  *Fig. 4B*

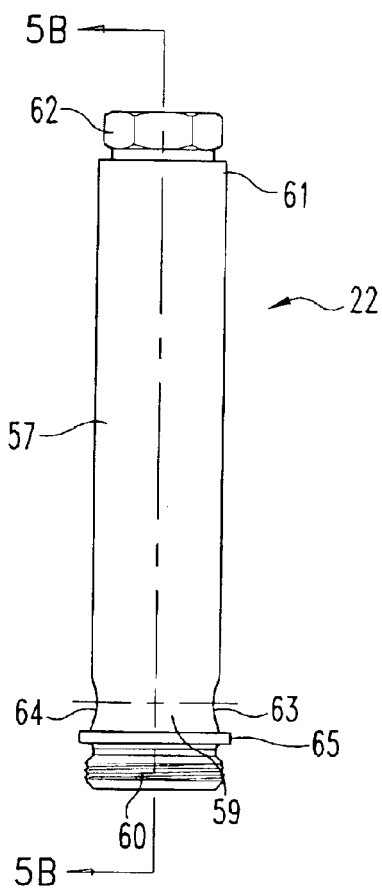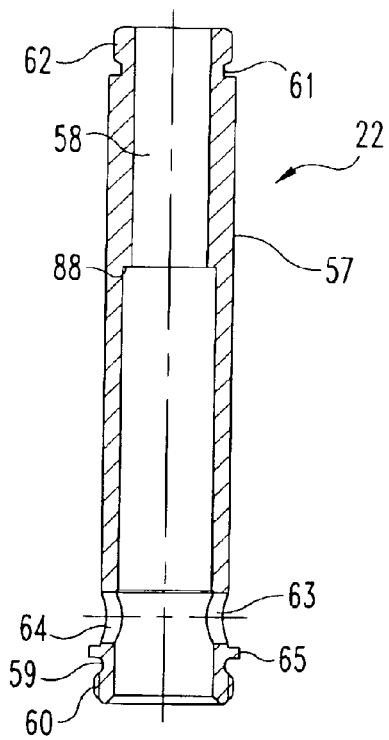
*Fig. 5A*  *Fig. 5B*

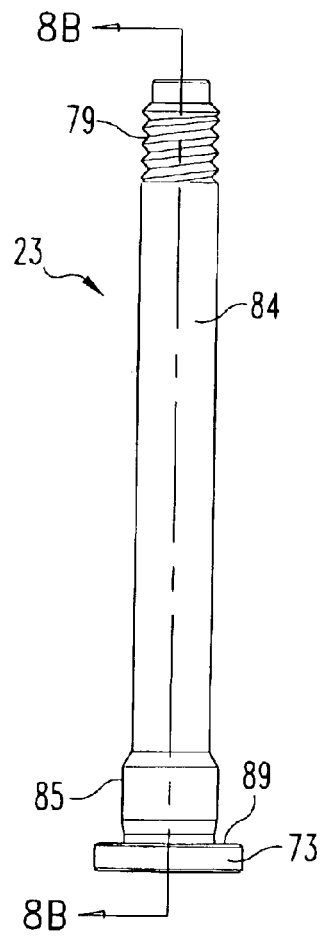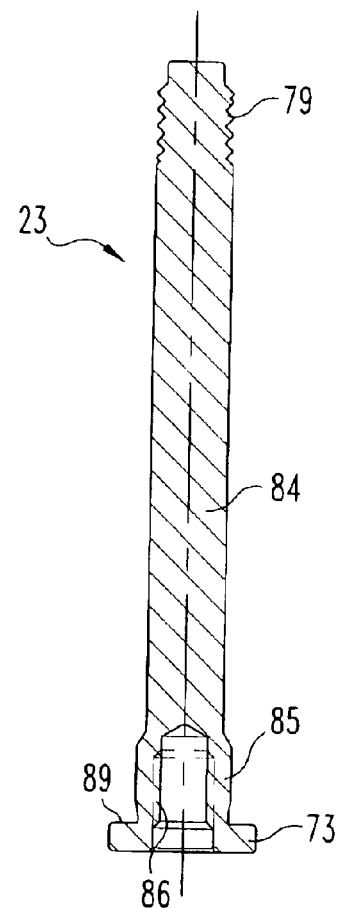
Fig. 8A
Fig. 8B

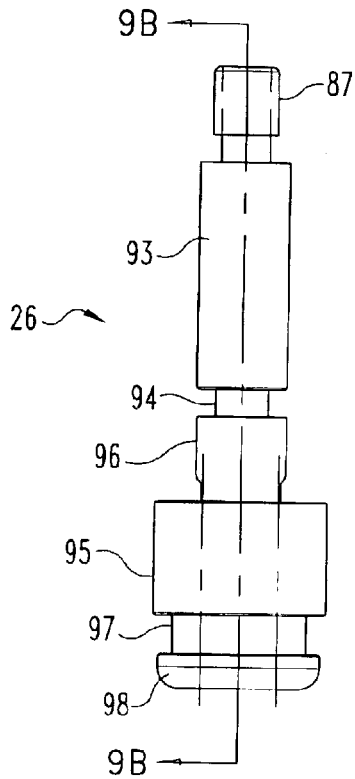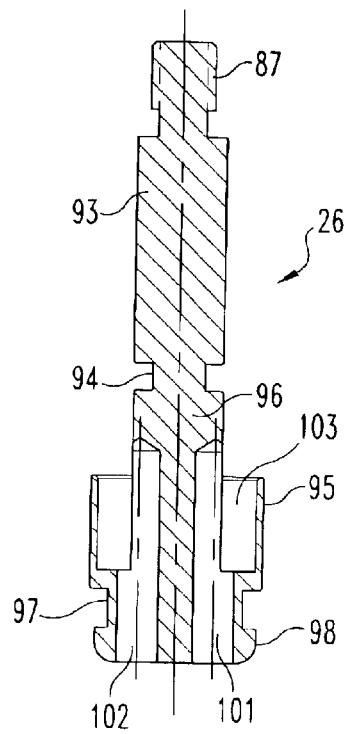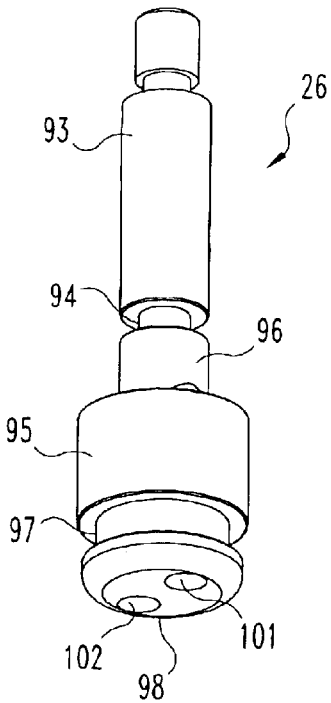
Fig. 9A
Fig. 9B
Fig. 9C

DIVERTER ASSEMBLY WITH INTEGRAL WATER-HAMMER ARRESTOR

BACKGROUND OF THE INVENTION

The present invention relates in general to fluid control systems for managing the flow of a liquid through a faucet arrangement. More specifically, the present invention relates to the use of a diverter as part of a faucet arrangement. The diverter is used to change the flow of water (or other liquid) from a high flow outlet to a low flow outlet. While diverters of this type are well known for water faucet arrangements, the present invention incorporates a unique and unobvious water-hammer arrestor that is used to reduce or dampen pressure spikes. While water-hammer/pressure-spike arrestor devices are known to exist, these devices are believed to be configured as separate components which need to be independently installed into the faucet arrangement. When the water-hammer arrestor is integral with the diverter, as provided by the present invention, a separate installation step is not required and this is a benefit to the installer and less expensive to the end user.

Diverting water from one outlet to another causes significant changes in the flow direction and corresponding pressure changes due to the change in momentum of the water. This diverting of water from one outlet to another outlet is typically associated with change in the flow of water from a high flow outlet to a low flow outlet. In the context of the present invention, a Roman-style bath faucet is disclosed where a high volume of water discharged from the spout is suddenly diverted to a flow-restricted shower device. The change in flow direction and momentum creates what is known as a "water-hammer" or "pressure-spike" effect. In order to try and prevent or at least reduce or dampen the level of the water-hammer or pressure-spike, some products incorporate a water-hammer/pressure-spike arrestor as part of the overall faucet arrangement.

For those fluid-control products that do not have a pressure-spike arrestor, notable pressure spikes will be apparent from the loud bang or thud that sounds when a user attempts to divert the water from one outlet to another outlet. When diverting of the water flow is attempted, there is a corresponding significant reduction in the water velocity and this contributes to the bang or thud that is heard. As disclosed herein, one example of the type of faucet structure where a diverter is used and where an integral water-hammer arrestor would be beneficial, is a Roman-style bath faucet. In designing faucet arrangements with diverters it should be noted that some degree of flow restriction is required by various codes and regulations and this flow restriction causes a significant and momentary increase in pressure.

The water-hammer arrestor of the present invention is uniquely constructed and arranged and is integrated into a faucet diverter assembly in order to dampen or reduce the described type of pressure spike.

SUMMARY OF THE INVENTION

A faucet diverter assembly with an integral water-hammer arrestor according to one embodiment of the present invention comprises a body, a diverter bonnet assembled into the body and in cooperation with the body defining a flow passage way therebetween, an upper stem constructed and arranged to be movable relative to the diverter bonnet, a lower stem attached to the upper stem, a movable plunger received by the lower stem, a return spring received by the upper stem and having an end acting against the diverter bonnet, a plunger spring received by the lower stem and having one end acting against the upper stem and an opposite end acting against the plunger, and wherein the plunger is movable in response to a fluid pressure-spike of sufficient force to compress the plunger spring.

One object of the present invention is to provide an improved faucet diverter assembly.

Related objects and advantages of the present invention will be apparent from the following description.

BRIEF DESCRIPTION OF THE DRAWINGS

FIG. 4A is a front elevational view of a tee body comprising one component of the FIG. 1 faucet diverter assembly according to the present invention.

FIG. 4B is a front elevational view in full section of the FIG. 4A tee body.

FIG. 5A is a front elevational view of a diverter bonnet comprising one component of the FIG. 1 faucet diverter assembly according to the present invention.

FIG. 5B is a front elevational view in full section of the FIG. 5A diverter bonnet.

FIG. 8A is a front elevational view of an upper stem comprising one component of the FIG. 1 faucet diverter assembly according to the present invention.

FIG. 8B is front elevational view in full section of the FIG. 8A upper stem.

FIG. 9A is a front elevational view of a lower stem comprising one component of the FIG. 1 faucet diverter assembly according to the present invention.

FIG. 9B. is a front elevational view in full section of the FIG. 9A lower stem.

FIG. 9C is a perspective view of the FIG. 9A lower stem.

DESCRIPTION OF THE PREFERRED EMBODIMENT

Figure 1:
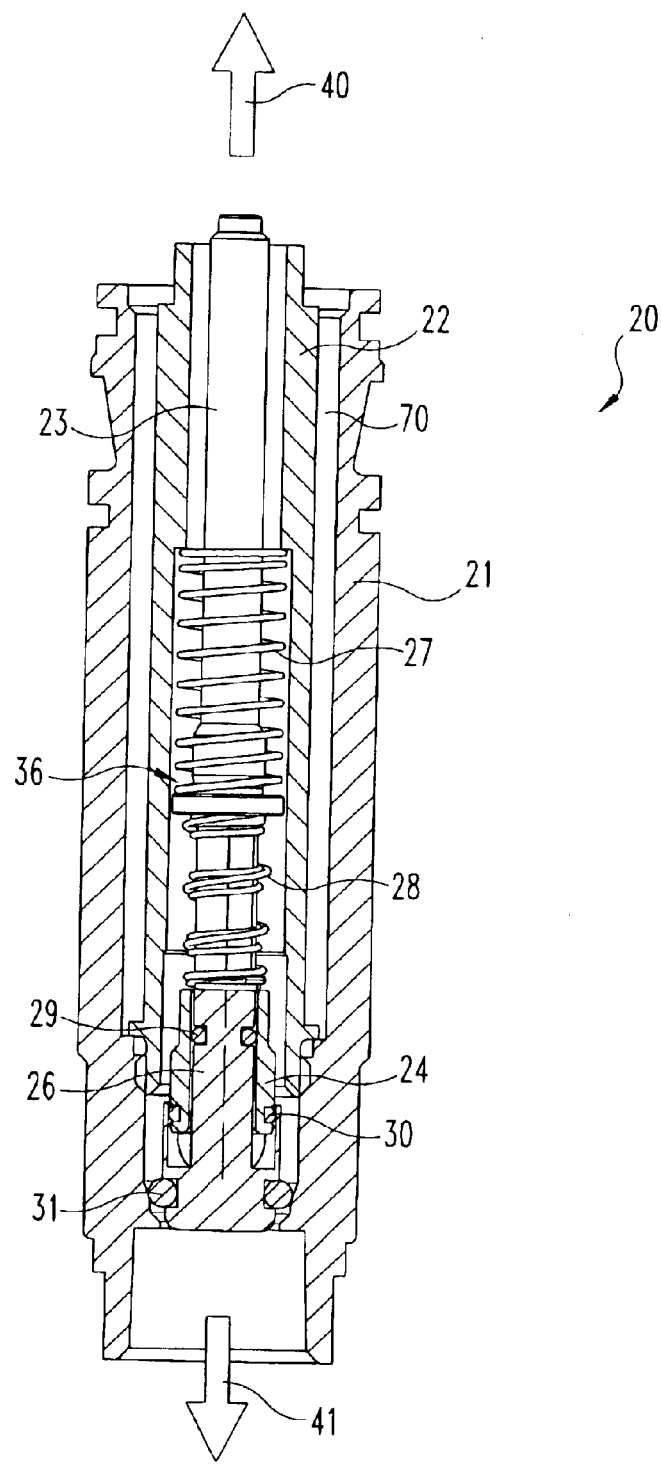
FIG. 1 is a front elevational view in full section of a faucet diverter assembly in a default position according to a typical embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
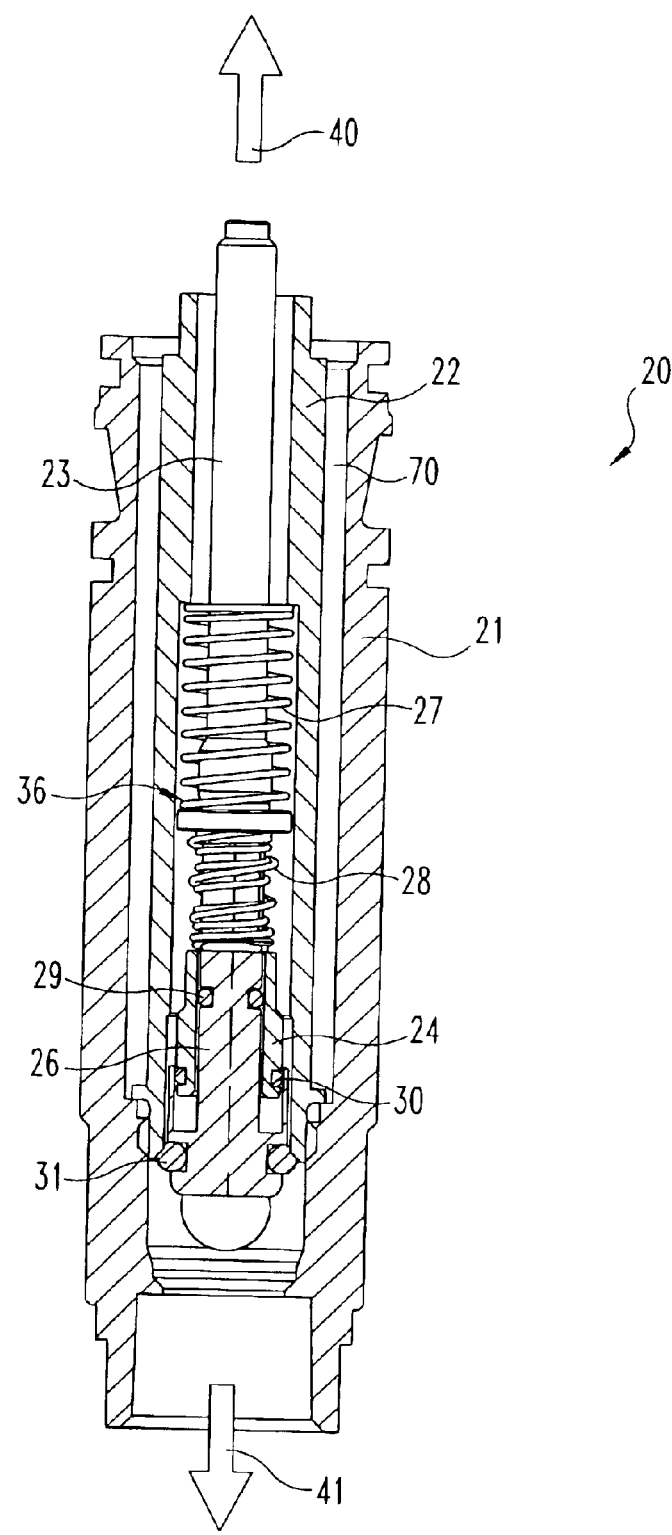
FIG. 2 is a front elevational view in full section of the FIG. 1 faucet diverter assembly in a diverter set position.

Referring to FIGS. 1 and 2 there is illustrated a faucet diverter assembly 20 according to the preferred embodiment of the present invention. Faucet diverter assembly 20 includes a tee body 21, diverter bonnet 22, upper stem 23, plunger 24, lower stem 26, upper spring 27, lower spring 28 and O-ring seals 29, 30 and 31. Also included as part of the faucet diverter assembly 20 is an extender 32 that is illustrated in FIGS. 6A, 6B, 7A and 7B. The faucet construction that includes tee body 21 is illustrated in partial form in FIG. 3.

Figure 6A:
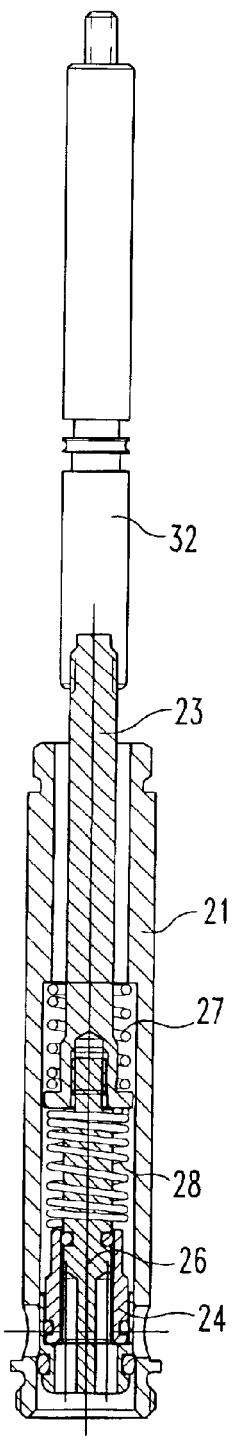
FIG. 6A is a front elevational view, in full section, of a diverter subassembly comprising a portion of the FIG. 1 faucet diverter assembly and corresponding to the FIG. 1 condition.
Figure 6B:
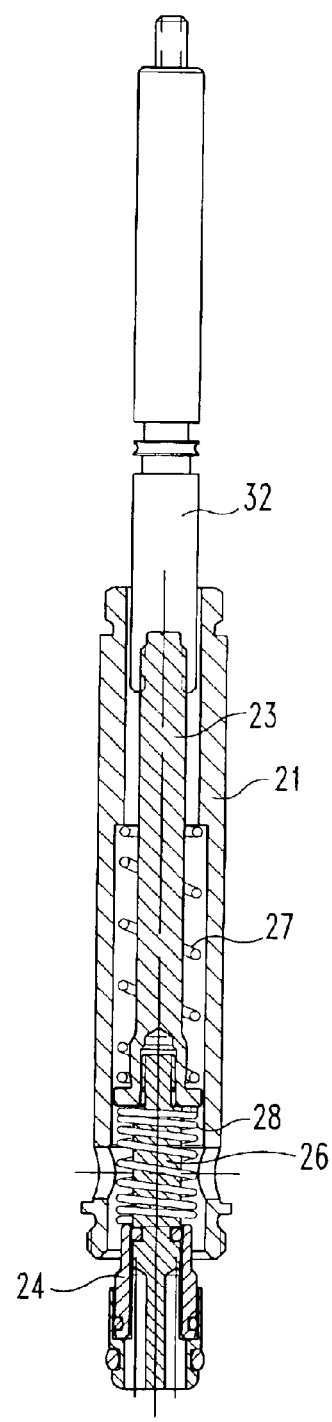
FIG. 6B is a front elevational view in full section of the FIG. 6A diverter subassembly corresponding to the FIG. 2 condition.
Figure 7A:
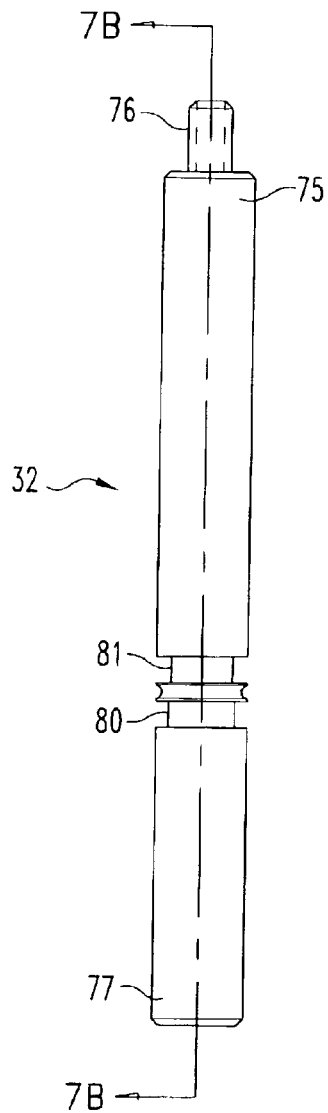
FIG. 7A is a front elevational view of an extender comprising one component of the FIG. 1 faucet diverter assembly according to the present invention.
Figure 7B:
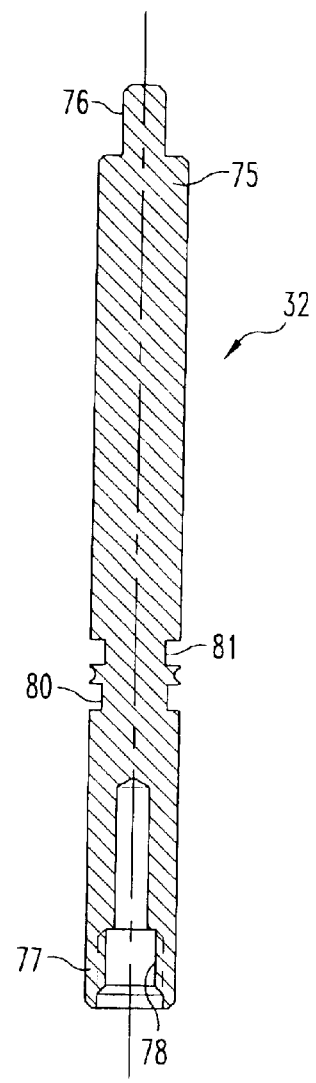
FIG. 7B is a front elevational view in full section of the FIG. 7A extender.
Figure 10A:
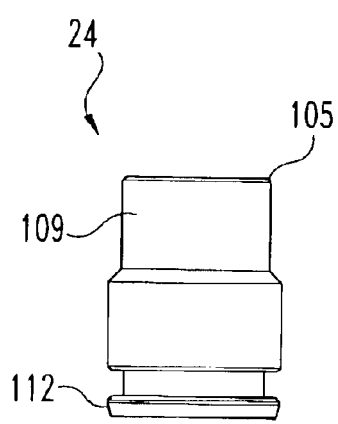
FIG. 10A is a front elevational view of a plunger comprising one component of the FIG. 1 faucet diverter assembly according to the present invention.
Figure 10B:
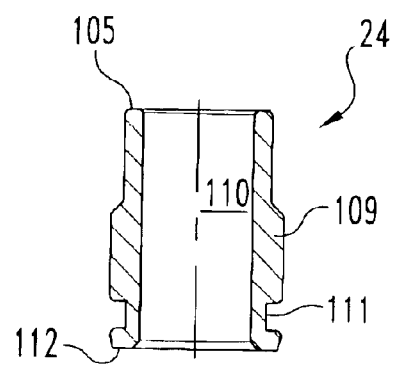
FIG. 10B is a front elevational view in full section of the FIG. 10A plunger.

The structural details of tee body 21 are illustrated in FIGS. 4A and 4B. The structural details of diverter bonnet 22 are illustrated in FIGS. 5A and 5B. The structural details of extender 32 are illustrated in FIGS. 7A and 7B. The structural details of upper stem 23 are illustrated in FIGS. 8A and 8B. The structural details lower stem 26 are illustrated in FIGS. 9A, 9B and 9C. The structural details of plunger 24 are illustrated in FIGS. 10A and 10B. A diverter subassembly 36 is illustrated in FIGS. 6A and 6B and this subassembly includes all of the component parts of the faucet diverter assembly 20, except for the tee body 21.

Figure 3:
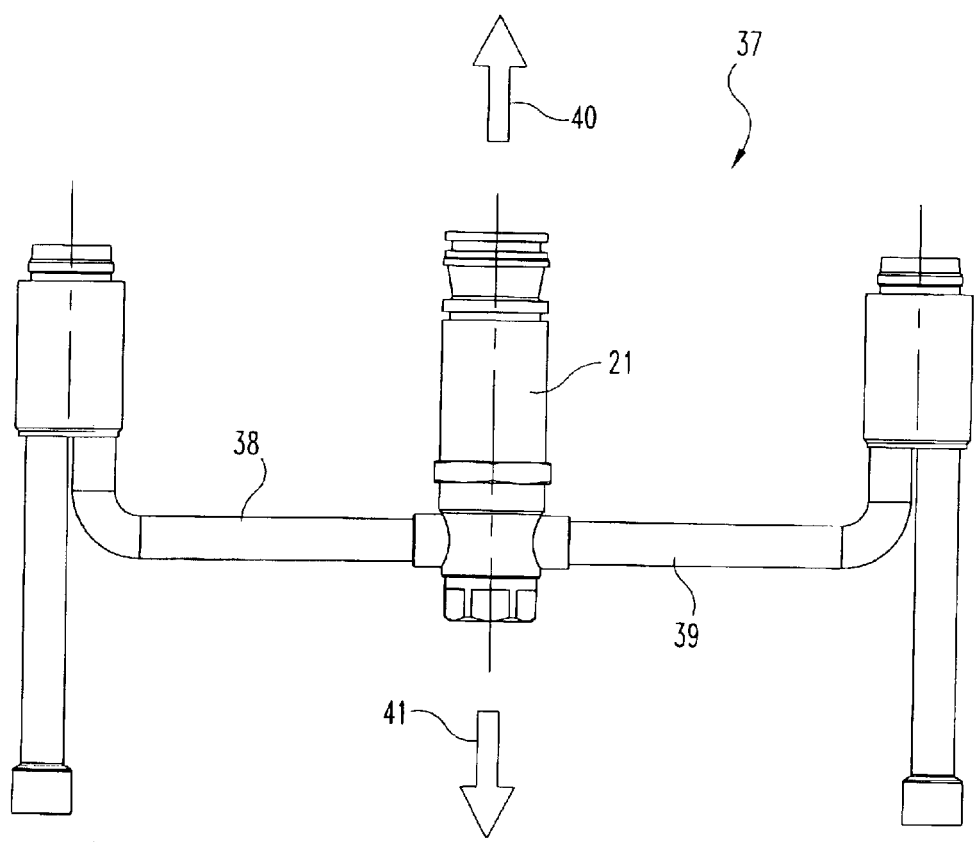
FIG. 3 is a partial, front elevational view of a Roman tub fixture illustrating the environment of use for the present invention.

The faucet diverter assembly 20, specifically the diverter subassembly 36, is constructed and arranged to be configurable in either a normal or default position (FIG. 1) or a diverter set position (FIG. 2). The typical fluid flow schematic for faucet diverter assembly 20 will be understood from the (partial) faucet fixture 37 illustrated in FIG. 3. As illustrated, faucet fixture 37 includes two water supply lines 38 and 39 representing incoming hot water and cold water, respectively, flowing into tee body 21. In the default position of FIG. 1, the flow of water is routed upwardly through the faucet diverter assembly 20 and the exit flow path for this position is schematically represented in FIG. 3 by arrow 40. This flow direction (i.e. arrow 40) is included in FIGS. 1 and 2, as well as in FIG. 3.

In the diverter set position of FIG. 2, the flow of water is routed downwardly and its exit path out of faucet diverter assembly 20 is represented by arrow 41. This flow direction (i.e. arrow 41) is included in FIGS. 1 and 2, as well as in FIG. 3. The axial position changes of the components of diverter subassembly 36 in order to selectively control the exiting flow direction, either upwardly (arrow 40) or downwardly (arrow 41) should be apparent from a careful review of and comparison between FIGS. 1 and 2.

The upper spring 27 is a biasing return spring such that when the incoming flow of water stops, the diverter portion of faucet diverter assembly 20 returns to the default position of FIG. 1. As used herein, the "diverter portion" includes all the components of the diverter subassembly 36, except for the diverter bonnet 22. The diverter bonnet 22 is constructed and arranged for secure threaded engagement within tee body 21. This means that tee body 21 and diverter bonnet 22 remain fixed to each other and remain stationary while the other components of the faucet diverter assembly 20 move axially between the FIG. 1 position and the FIG. 2 position.

As would be generally understood regarding the construction and use of water diverter arrangements, it is necessary to have sufficient incoming water pressure to overcome the opposing force exerted by the biasing spring, in this case upper spring 27, in order to keep the diverter portion of faucet diverter assembly 20 in the diverter set position of FIG. 2. When the water pressure drops below this spring force threshold, the upper spring 27 functions to return the diverter portion to the default position of FIG. 1.

Referring now to FIGS. 4A and 4B, the structural details of unitary tee body 21 are illustrated. Tee body 21 includes a generally cylindrical body 44 defining a hollow interior 45, a first end 46 defining an exit flow opening 47 and a second end 48 defining an exit flow opening 49. When the tee body 21 is assembled as part of the faucet diverter assembly 20, the exit flow opening 47 defines the flow path when the faucet diverter assembly 20 is in the default position of FIG. 1. Exit flow opening 49 defines the flow path when the faucet diverter assembly 20 is in the diverter set position of FIG. 2. Adjacent to opening 49 is an internally-threaded section 50 that is designed for threaded receipt of diverter bonnet 22. Body 44 further defines two inlet flow apertures 51 and 52 that are coaxial with each other and constructed and arranged to connect to the two water supply lines 38 and 39, respectively.

Opening 49 is internally threaded with pipe threads for fluid conduit connection to the diverter accessory, such as a flow-restricted shower device, according to the preferred embodiment of the present invention. The exterior surface of body 44 adjacent opening 47 is configured with O-ring channels for the receipt of O-ring seals to be used in establishing a sealed interface between the tee body and the receiving structure of the faucet that receives faucet diverter assembly 20.

Referring now to FIGS. 5A and 5B, the structural details of unitary diverter bonnet 22 are illustrated. Diverter bonnet 22 includes a generally cylindrical body 57 defining a hollow interior 58, a first end 59 having an externally-threaded surface 60, and a second end 61 having a hex-shaped portion 62. Body 57 is cross drilled in order to create coaxially flow openings 63 and 64 that are located adjacent first end 59.

Externally-threaded surface 60 is constructed and arranged to threadedly assemble into internally-threaded section 50 of tee body 21. The axially lengths of the tee body 21 and diverter bonnet 22 are such that hex-shaped portion 62 is able to be used with a hex-driver or wrench in order to threadedly assemble the diverter bonnet 22 into the tee body 21. Radial flange 65 is constructed and arranged to abut up against annular shoulder 66 as a way to properly set the axial relationship between the diverter bonnet 22 and the tee body 21.

As is clearly illustrated in the assembly drawings of FIGS. 1 and 2, there is an annular clearance space 70 between the diverter bonnet 22 and the tee body 21. This annular clearance space 70 represents the primary flow passageway for the exiting flow of water when the faucet diverter assembly 20 is in the default position of FIG. 1. As will be additionally described herein, the coaxially flow opening 63 and 64 provide flow communication from the hollow interior 58 of diverter bonnet 22 into the annular clearance space 70.

Referring now to FIGS. 6A and 6B, the diverter subassembly 36 is illustrated, first in the FIG. 1 condition and then in the FIG. 2 condition. As described, the faucet diverter assembly 20 includes the diverter subassembly 36 assembled into the tee body 21. Since the diverter subassembly 36 includes a stationary member, specifically the diverter bonnet 22, and an axially movable portion, it is helpful to separately talk in terms of the "diverter portion" of diverter subassembly 36. It is the diverter portion that is moved axially within the diverter bonnet 22 that causes a change in state of the faucet diverter assembly 20 between the positions of FIGS. 1 and 2.

Diverter subassembly 36 includes extender 32 and it is extender 32 that typically "extends" upwardly through the faucet in order to manually activate the faucet diverter assembly 20 so as to change its condition from the default position of FIG. 1 to the diverter set position of FIG. 2. For function and design aesthetics, the free end of the extender 32 is fitted with a knob or handle (not illustrated). The extender 32 is not illustrated as part of the faucet diverter assembly 20 in FIGS. 1 and 2, but this is only for drawing simplicity. It is to be noted that the diverter portion is moved manually, and some structure, such as extender 32, is typically used for this purpose.

Diverter assembly 36 includes, in addition to extender 32, upper stem 23, plunger 24, lower stem 26, upper (return) spring 27 and lower (plunger biasing) spring 28. In view of the coaxially and reciprocating nature of the various component parts assembled into faucet diverter assembly 20, there are several interfaces that need to be sealed. O-ring seal 29 is positioned between the body 93 of lower stem 26 and plunger 24. O-ring seal 30 is positioned between plunger 24 and sleeve 95 of lower stem 26. O-ring seal 31 is positioned between the lower stem 26 and tee body 21 in the default position of FIG. 1 and between the lower stem 26 and the diverter bonnet 22 in the diverter set position of FIG. 2.

Although additional details regarding each of the primary component parts of the diverter portion will be provided hereinafter, preliminarily it should be noted that the upper stem 23 is threadedly assembled into the extender and the upper (return) spring 27 is received by upper stem 23. The plunger 24 is received by the lower stem 26 and the lower (plunger biasing) spring 28 is received by the lower stem. Spring 28 is positioned between plunger 24 and the flanged base 73 of upper stem 23.

Referring now to FIGS. 7A and 7B, the structural details of unitary extender 32 are illustrated. Extender 32 includes a first end 75 with an externally-threaded, reduced diameter portion 76. The opposite end 77 includes an internally-threaded bore 78 that is constructed and arranged for threaded receipt of the externally-threaded end 79 of upper stem 23. Positioned intermediate first end 75 and opposite end 77 are two O-ring grooves 80 and 81. In the final assembly of the faucet diverter assembly 20, the O-ring seals to be positioned in grooves 80 and 81 are intended to seal against the spout bore.

Referring now to FIGS. 8A and 8B, the structural details of the unitary upper stem 23 are illustrated. Upper stem 23 includes a generally cylindrical body 84 terminating at one end with the externally-threaded end 79. At the opposite end 85, there is an internally-threaded bore 86 that is concentric with the generally cylindrical, flanged base 73. Bore 86 is constructed and arranged to threadedly receive the externally-threaded reduced diameter portion 87 of the lower stem 26. Body 84 is sized to receive the upper (return) spring 27. The ends of the upper (return) spring 27 abut up against shoulder 88 of the diverter bonnet 22 and up against the inward surface 89 of the flanged base 73, respectively. Since the upper stem 23 is axially movable by means of the extender 32, and since the diverter bonnet 22 remains stationary, the upper (return) spring 27 is compressed. So long as the spring force applied against flanged base 73 is exceeded by the incoming water pressure force acting against the lower stem 26, the diverter subassembly 36 remains in the diverter set position of FIG. 2. When the spring force exceeds the water pressure force, the diverter subassembly 36 automatically returns to the default position of FIG. 1.

Referring now to FIGS. 9A, 9B and 9C, the structural details of the unitary lower stem 26 are illustrated. Lower stem 26 includes a shaft body 93, a first O-ring groove 94, a cylindrical sleeve 95, a shaft portion 96, a second O-ring groove 97 and a cap-like end 98. The first O-ring groove 94 is constructed and arranged to receive O-ring seal 29. The second O-ring groove 97 is constructed and arranged to receive O-ring seal 31.

The cap-like end 98 defines a pair of space depart, substantially parallel flow inlet passageways 101 and 102. The cylindrical sleeve 95 defines an annular hollow interior 103 surrounding shaft portion 96. The two flow inlet passageways 101 and 102 extend into hollow interior 103. The hollow interior 103 has an inside diameter dimension that is larger than the outside diameter of plunger 24. This enables the plunger 24 to slide axially based upon any force imbalance between the lower (plunger biasing) spring 28 on one end of the plunger and any fluid pressure on the opposite end of plunger 24. As illustrated in FIGS. 1 and 2, the lower (plunger biasing) spring 28 is received by shaft body 93 of the lower stem 26 with one end abutting up against flanged base 73 and with the opposite end abutting up against end 105 of plunger 24.

Referring now to FIGS. 10A and 10B, the structural details of unitary plunger 24 are illustrated. Plunger 24 includes an annular side wall 109 defining a substantially cylindrical hollow interior 110 and an O-ring groove 111 for receipt of O-ring seal 30. A first end 112 is constructed and arranged to fit within hollow interior 103. The opposite end 105 is constructed and arranged to abut up against the lower (plunger biasing) spring 28.

Now that the structural components of faucet diverter assembly 20 have been described, including some of their functioning relationships, the overall operation of faucet diverter assembly 20 will now be described, focusing primarily on FIGS. 1 and 2.

Referring again to FIGS. 1 and 2, the assembled arrangement of the component parts includes an axially-fixed relationship between tee body 21 and diverter bonnet 22 as well as the annular clearance space 70 that is defined by the radial spacing between tee body 21 and diverter bonnet 22. Clearance space 70 provides the primary flow corridor or passage for the flow of water when the diverter portion of the assembly is in the default position of FIG. 1. The two apertures 63 and 64 formed by the cross drilling of diverter bonnet 22 provide the flow openings for the water that is interior to the diverter bonnet 22 to be able to flow into clearance space 70.

In the default position of FIG. 1, incoming water, whether hot or cold or a mixture, is able to flow through interior clearance spaces and voids located between the lower stem 26, plunger 24 and the diverter bonnet 22. O-ring seal 31 is received by O-ring groove 97 defined by the lower stem 26 and this construction seals up against a radial lip portion 114 of tee body 21. The axial location for the sealed interface between O-ring seal 31 and tee body 21 is axially below the lowermost edges of the water inlet flow apertures 51 and 52 such that there is no path for water to flow downwardly through the lower exit flow opening 49. The described sealed interfaces are maintained while the faucet diverter assembly 20 is in the default position of FIG. 1.

In order to activate the diverter portion of the faucet diverter assembly 20, for selection of the diverter accessory, the diverter portion is manually actuated by means of extender 32 and this moves the diverter portion, including O-ring seal 31 to the FIG. 2 position. In the diverter set position of FIG. 2, the lower stem 26 and O-ring seal 31 have been manually moved to a raised position such that the O-ring seal 31 is in sealing abutment against the end of diverter bonnet 22. As is illustrated, the water inlet flow apertures 51 and 52 are exposed below the cap-like end 98 of lower stem 26. In this condition under normal operating parameters, the incoming flow of water is typically not able to flow past the sealed interface and thus flows downwardly and exits by way of the lower exit flow opening 49.

In order to maintain the diverter portion in the diverter set position of FIG. 2, the incoming water pressure must exceed the spring force of upper (return) spring 27. When the water is turned off or at least turned down to a point where the pressure drops below the spring force, the diverter assembly automatically returns to the default position of FIG. 1. The upper end of upper (return) spring 27 abuts up against shoulder 88 of diverter bonnet 22 and insures that the diverter portion is always brought back to the default position. The opposite end of the upper spring 27 abuts up against the flanged base 73 of upper stem 23. The spring biasing force is determined by the free spring length, the spring constant and the length dimension between flanged base 73 and shoulder 88.

As discussed and described in the Background, faucet assemblies of the type that include a diverter accessory, such as a flow-restricted device shower device, need to (or at least should) address the issue or pressure spikes of what may alternatively be called a "water hammer". It is known that diverting water from a high flow outlet to a low flow outlet (the diverter accessory) causes significant changes in momentum and consequently pressure changes (a spike). It is also know that reducing or dampening any such pressure spikes (i.e. water hammers) is beneficial from a consumer perspective. The prior art approach is to use a separate (additional component, not a part of the faucet diverter assembly), that is constructed and arranged as a water hammer/pressure spike arrestor. As a separate, additional component, such arrestors have to be individually and separately installed and thus there is a time and cost issue.

The present invention addresses the water hammer/pressure spike issue by integrating into the actual faucet diverter assembly 20, a spring biased plunger (water hammer arrestor) that is able to move only when the sensed pressure or fluid force is higher than that designed for the specific faucet diverter assembly, which would include the selected parameters for the plunger biasing spring 28. When a water hammer pressure spike occurs that has a pressure level above the design threshold, the biasing spring 28 is compressed by the movement of plunger 24, much like a shock absorber. The fluid pressure on or sensed by plunger 24 is by way of flow passageways 101 and 102. By integrating this shock absorber feature into the overall design of faucet diverter assembly 20, there is no need to separately install an arrestor to address the pressure spike issue.

A further feature of the present invention addresses yet another issue in the use of a faucet diverter assembly. While the shock absorber scheme of plunger 24 and spring 28 (water hammer arrestor) is suitable for addressing the problem of pressure spikes, there may be a question as to what will occur if the pressure spike is significantly high enough and for a long enough duration. The present invention addresses this concern by the incorporation of a sliding O-ring seal as part of plunger 24. Specifically, O-ring seal 30 as received in O-ring groove 111 moves with plunger 24 and as described, the movement of plunger 24 with O-ring seal 30 is best described as a sliding O-ring seal. In the design and construction of the present invention, if the pressure spike is significantly high enough and of a long enough duration, this causes the O-ring seal 30 to leave its sealed condition between the plunger 24 and sleeve 95 of lower stem 26. This in turn allows for a bypass for the water by way of annular clearance space 70. Once the pressure spike has subdued or ended, the lower spring 28 returns the plunger to its original position and reestablishes a seal with sleeve 95 for a complete diversion of the water.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A faucet diverter assembly comprising:
   a body;
   a diverter bonnet assembled into said body and in cooperation with said body defining a flow passageway therebetween;
   an upper stem constructed and arranged to be movable relative to said diverter bonnet;
   a lower stem attached to said upper stem;
   a movable plunger received by said lower stem; and
   a plunger spring received by said lower stem and having one end acting against said upper stem and an opposite end acting against said plunger, wherein said plunger is movable relative to said lower stem in response to a fluid pressure spike of sufficient force to compress said plunger spring.

2. The faucet diverter assembly of claim 1 wherein said lower stem includes a shaft portion and a sleeve portion.

3. The faucet diverter assembly of claim 2 wherein said sleeve portion and said shaft portion are generally concentric to each other.

4. The faucet diverter assembly of claim 3 wherein said movable plunger having a sidewall that defines a hollow interior and a seal groove.

5. The faucet diverter assembly of claim 4 which further includes a seal positioned into said seal groove, said seal being positioned against said sleeve portion.

6. The faucet diverter assembly of claim 5 wherein said lower stem including a first end defining a flow inlet passage.

7. The faucet diverter assembly of claim 6 wherein said sleeve portion and said shaft portion defining a clearance space therebetween, said flow inlet passage being in flow communication with said clearance space.

8. The faucet diverter assembly of claim 1 wherein said movable plunger having a sidewall that defines a hollow interior and a seal groove.

9. The faucet diverter assembly of claim 8 which further includes a seal positioned into said seal groove, said seal being positioned against a portion of said lower stem.

10. The faucet diverter assembly of claim 9 wherein said lower stem including a first end defining a flow inlet passage.

11. The faucet diverter assembly of claim 10 wherein said sleeve portion and said shaft portion defining a clearance space therebetween, said flow inlet passage being in flow communication with said clearance space.

12. The faucet diverter assembly of claim 1 wherein said lower stem including a first end defining a flow inlet passage.

13. The faucet diverter of claim 12 wherein said sleeve portion and said shaft portion defining a clearance space therebetween, said flow inlet passage being in flow communication with said clearance space.

14. A faucet diverter assembly comprising;
a body;
a diverter bonnet assembled into said body, and in cooperation with said body defining a flow passageway therebetween;
an upper stem constructed and arranged to be movable relative to said diverter bonnet;
a lower stem attached to said upper stem; and
shock absorber means for dampening fluid pressure spikes resulting from the operation of said faucet diverter assembly, said shock absorber means being received by said lower stem, said shock absorber means being movable relative to said lower stem in response to a fluid pressure spike.

15. The faucet diverter assembly of claim 14 wherein said shock absorber means including a movable plunger and a plunger biasing spring.

16. The faucet diverter assembly of claim 15 wherein said lower stem includes a shaft portion and a sleeve portion.

17. The faucet diverter assembly of claim 16 wherein said sleeve portion and said shaft portion are generally concentric to each other.

18. The faucet diverter assembly of claim 17 wherein said movable plunger having a sidewall that defines a hollow interior and a seal groove.

19. The faucet diverter assembly of claim 18 which further includes a seal positioned into said seal groove, said seal being positioned against said sleeve portion.

20. The faucet diverter assembly of claim 19 wherein said lower stem including a first end defining a flow inlet passage.

21. The faucet diverter assembly of claim 20 wherein said sleeve portion and said shaft portion defining a clearance space therebetween, said flow inlet passage being in flow communication with said clearance space.

22. The faucet diverter assembly of claim 15 wherein said movable plunger having a sidewall that defines a hollow interior and a seal groove.

23. The faucet diverter assembly of claim 22 which further includes a seal positioned into said seal groove, said seal being positioned against said sleeve portion.

24. The faucet diverter assembly of claim 23 wherein said lower stem including a first end defining a flow inlet passage.

25. The faucet diverter assembly of claim 24 wherein said sleeve portion and said shaft portion defining a clearance space therebetween, said flow inlet passage being in flow communication with said clearance space.

26. A faucet diverter assembly comprising:
a housing; and
a diverter portion received by said housing and being axially movable relative to said housing, said diverter portion including an upper stem, a lower stem, and shock absorber means for dampening fluid pressure spikes resulting from the operation of said faucet diverter assembly, said lower stem being assembled to said upper stem and said shock absorber means being received by said lower stem, said shock absorber means being movable relative to said lower stem in response to a fluid pressure spike.

27. The faucet diverter assembly of claim 26 wherein said shock absorber means including a movable plunger and a plunger biasing spring.

28. The faucet diverter assembly of claim 27 wherein said lower stem includes a shaft portion and a sleeve portion.

29. The faucet diverter assembly of claim 28 wherein said sleeve portion and said shaft portion are generally concentric to each other.

30. The faucet diverter assembly of claim 29 wherein said movable plunger having a sidewall that defines a hollow interior and a seal groove.

31. The faucet diverter assembly of claim 30 which further includes a seal positioned into said seal groove, said seal being positioned against said sleeve portion.

32. The faucet diverter assembly of claim 31 wherein said lower stem including a first end defining a flow inlet passage.

33. The faucet diverter assembly of claim 32 wherein said sleeve portion and said shaft portion defining a clearance space therebetween, said flow inlet passage being in flow communication with said clearance space.

34. The faucet diverter assembly of claim 27 wherein said movable plunger having a sidewall that defines a hollow interior and a seal groove.

35. The faucet diverter assembly of claim 34 which further includes a seal positioned into said seal groove, said seal being positioned against said sleeve portion.

36. The faucet diverter assembly of claim 35 wherein said lower stem including a first end defining a flow inlet passage.

37. The faucet diverter assembly of claim 36 wherein said sleeve portion and said shaft portion defining a clearance space therebetween, said flow inlet passage being in flow communication with said clearance space.

38. A faucet diverter assembly comprising:
a body;
a diverter bonnet assembled into said body and in cooperation with said body defining a flow passageway therebetween;
an upper stem constructed and arranged to be movable relative to said diverter bonnet;
a lower stem attached to said upper stem, said lower stem including a shaft portion and a sleeve portion that are generally concentric to each other;
a movable plunger received by said lower stem, said movable plunger having a sidewall that defines a hollow interior and a seal groove;
a plunger spring received by said lower stem and having one end acting against said upper stem and an opposite end acting against said plunger, wherein said plunger is movable in response to a fluid pressure spike of sufficient force to compress said plunger spring; and
a seal positioned into said seal groove, said seal being positioned against said sleeve portion.

39. A faucet diverter assembly comprising:
a body;
a diverter bonnet assembled into said body and in cooperation with said body defining a flow passageway therebetween;
an upper stem constructed and arranged to be movable relative to said diverter bonnet;
a lower stem attached to said upper stem;
a movable plunger received by said lower stem, said movable plunger having a sidewall that defines a hollow interior and a seal groove;
a plunger spring received by said lower stem and having one end acting against said upper stem and an opposite end acting against said plunger, wherein said plunger is movable in response to a fluid pressure spike of sufficient force to compress said plunger spring; and a seal positioned into said seal groove, said seal being positioned against a portion of said lower stem.

40. A faucet diverter assembly comprising;

a body;

a diverter bonnet assembled into said body, and in cooperation with said body defining a flow passageway therebetween;

an upper stem constructed and arranged to be movable relative to said diverter bonnet;

a lower stem attached to said upper stem, said lower stem including a shaft portion and a sleeve portion that are generally concentric to each other;

shock absorber means for dampening fluid pressure spikes resulting from the operation of said faucet diverter assembly, said shock absorber means being received by said lower stem and including a movable plunger and a plunger biasing spring, said movable plunger having a sidewall that defines a hollow interior and a seal groove; and a seal positioned into said seal groove, said seal being positioned against said sleeve portion.

41. A faucet diverter assembly comprising;

a body;

a diverter bonnet assembled into said body, and in cooperation with said body defining a flow passageway therebetween;

an upper stem constructed and arranged to be movable relative to said diverter bonnet;

a lower stem attached to said upper stem;

shock absorber means for dampening fluid pressure spikes resulting from the operation of said faucet diverter assembly, said shock absorber means being received by said lower stem, said shock absorber means including a movable plunger and a plunger biasing spring, said movable plunger having a sidewall that defines a hollow interior and a seal groove; and a seal positioned into said seal groove, said seal being positioned against said sleeve portion.

42. A faucet diverter assembly comprising:

a housing; and a diverter portion received by said housing and being axially movable relative to said housing, said diverter portion including an upper stem, a lower stem, and shock absorber means for dampening fluid pressure spikes resulting from the operation of said faucet diverter assembly, said lower stem including a shaft portion and a sleeve portion that are generally concentric to each other, said lower stem being assembled to said upper stem and said shock absorber means being received by said lower stem, said shock absorber means including a movable plunger and a plunger biasing spring, said movable plunger having a sidewall that defines a hollow interior and a seal groove, said diverter portion further including a seal positioned into said seal groove, said seal being positioned against said sleeve portion.

43. A faucet diverter assembly comprising:

a housing; and a diverter portion received by said housing and being axially movable relative to said housing, said diverter portion including an upper stem, a lower stem, and shock absorber means for dampening fluid pressure spikes resulting from the operation of said faucet diverter assembly, said shock absorber means including a movable plunger and a plunger biasing spring, said movable plunger having a sidewall that defines a hollow interior and a seal groove, said lower stem being assembled to said upper stem and said shock absorber means being received by said lower stem, said diverter portion further including a seal positioned into said seal groove, said seal being positioned against said sleeve portion.

44. A faucet diverter assembly comprising:

a body;

a diverter bonnet assembled into said body and in cooperation with said body defining a flow passageway therebetween;

an upper stem constructed and arranged to be movable relative to said diverter bonnet;

a diverter biasing spring received by said upper stem and acting against said diverter bonnet;

a lower stem attached to said upper stem;

a movable plunger received by said lower stem; and a shock absorber spring received by said lower stem and having one end acting against said upper stem and an opposite end acting against said plunger, wherein said plunger is movable in response to a fluid pressure spike of sufficient force to compress said shock absorber spring.

45. A faucet diverter assembly comprising:

a body;

a diverter bonnet assembled into said body and in cooperation with said body defining a flow passageway therebetween;

a stem constructed and arranged to be movable relative to said diverter bonnet, said stem having an upper portion and a lower portion;

a diverter biasing spring received by said upper portion and acting against said diverter bonnet;

a movable plunger received by said lower portion; and a shock absorber spring received by said lower portion and having one end acting against said upper portion and an opposite end acting against said plunger, wherein said plunger is movable in response to a fluid pressure spike of sufficient force to compress said shock absorber spring.

46. A faucet diverter assembly comprising:

a body;

a diverter bonnet assembled into said body and in cooperation with said body defining a flow passageway therebetween;

a stem having an upper portion and a lower portion and being constructed and arranged to be movable relative to said diverter bonnet;

a movable plunger received by said lower portion; and a plunger spring received by said lower portion and having one end acting against said upper portion and an opposite end acting against said plunger, wherein said plunger is movable relative to said lower portion in response to a fluid pressure spike of sufficient force to compress said plunger spring.

47. A faucet diverter assembly comprising;

a body;

a diverter bonnet assembled into said body, and in cooperation with said body defining a flow passageway therebetween;

a stem having an upper portion and a lower portion and being constructed and arranged to be movable relative to said diverter bonnet; and shock absorber means for dampening fluid pressure spikes resulting from the operation of said faucet diverter assembly, said shock absorber means being received by said lower portion, said shock absorber means being movable relative to said lower portion in response to a fluid pressure spike.

48. A faucet diverter assembly comprising:

a housing; and a diverter portion received by said housing and being axially movable relative to said housing, said diverter portion including a stem having an upper portion and a lower portion, and shock absorber means for dampening fluid pressure spikes resulting from the operation of said faucet diverter assembly, said lower portion being assembled to said upper portion and said shock absorber means being received by said lower portion, said shock absorber means being movable relative to said lower portion in response to a fluid pressure spike.

* * * * *